(12) United States Patent
Lin et al.

(10) Patent No.: US 7,218,579 B2
(45) Date of Patent: May 15, 2007

(54) LONG SEEK CONTROL DEVICE FOR OPTICAL DISK DRIVE AND METHOD THEREOF

(75) Inventors: Feng-Fu Lin, Taipei (TW); Yi-Jen Chung, Taipei (TW)

(73) Assignee: ALi Corporation, Taipei (TW)

( * ) Notice: Subject to any disclaimer, the term of this patent is extended or adjusted under 35 U.S.C. 154(b) by 566 days.

(21) Appl. No.: 10/829,968

(22) Filed: Apr. 23, 2004

(65) Prior Publication Data

US 2005/0190667 A1    Sep. 1, 2005

(30) Foreign Application Priority Data

Feb. 27, 2004  (TW)  .............................. 93105037 A (51) Int. Cl.
*G11B 7/00*    (2006.01)
(52) U.S. Cl. .................................. 369/44.28
(58) Field of Classification Search ..................... None
See application file for complete search history.

(56) References Cited

U.S. PATENT DOCUMENTS 6,606,283 B2 *  8/2003  Chan ....................... 369/30.15

* cited by examiner

*Primary Examiner*—Wayne Young
*Assistant Examiner*—Lixi Chow
(74) *Attorney, Agent, or Firm*—Troxell Law Office, PLLC (57) ABSTRACT

A optical disk drive long distance seek control device and method thereof, capable of feeding back the optical head control device through the step motor control device during the long distance seek; wherein, the step motor control device comprises a velocity profile generator capable of producing a quadratic profile to stabilize the step motor when finishing the seek; and more particular, the optical head control device uses a center error signal and a velocity error signal alternatively; moreover, the velocity error signal can be adjusted according to the output signals from the optical head control device and the step motor control device through a weighting mechanism.

17 Claims, 6 Drawing Sheets

LONG SEEK CONTROL DEVICE FOR OPTICAL DISK DRIVE AND METHOD THEREOF

FIELD OF THE INVENTION

The present invention relates to a long seek control device for optical disk drive and method thereof, and more particularly, to a long seek control device having a feedback and a weighting mechanisms for optical disk drive and the method thereof.

BACKGROUND OF THE INVENTION

Since the manufacturing cost of the driving mechanisms utilizing step motors are not only much cheaper than that of the driving mechanisms utilizing DC motors, but also the driving mechanisms utilizing step motors are more suitable for high velocity seeking, the optical disk drive using step motors for driving the optical head thereof has become the mainstream product in the recent years.

Conventionally, while a step motor is being used to drive the optical head of an optical disk drive, the profile of the velocity profile generator arranged in the step motor control device is usually being designed to accelerate or decelerate very rapidly so as to reduce the seek time in a long seek operation. Under the circumstance, the rotation inertia of the step motor is becoming larger such that the resonant effect is becoming considerably obvious. As the result, the optical head is difficult to lock on a track after the seeking.

Figure 1:
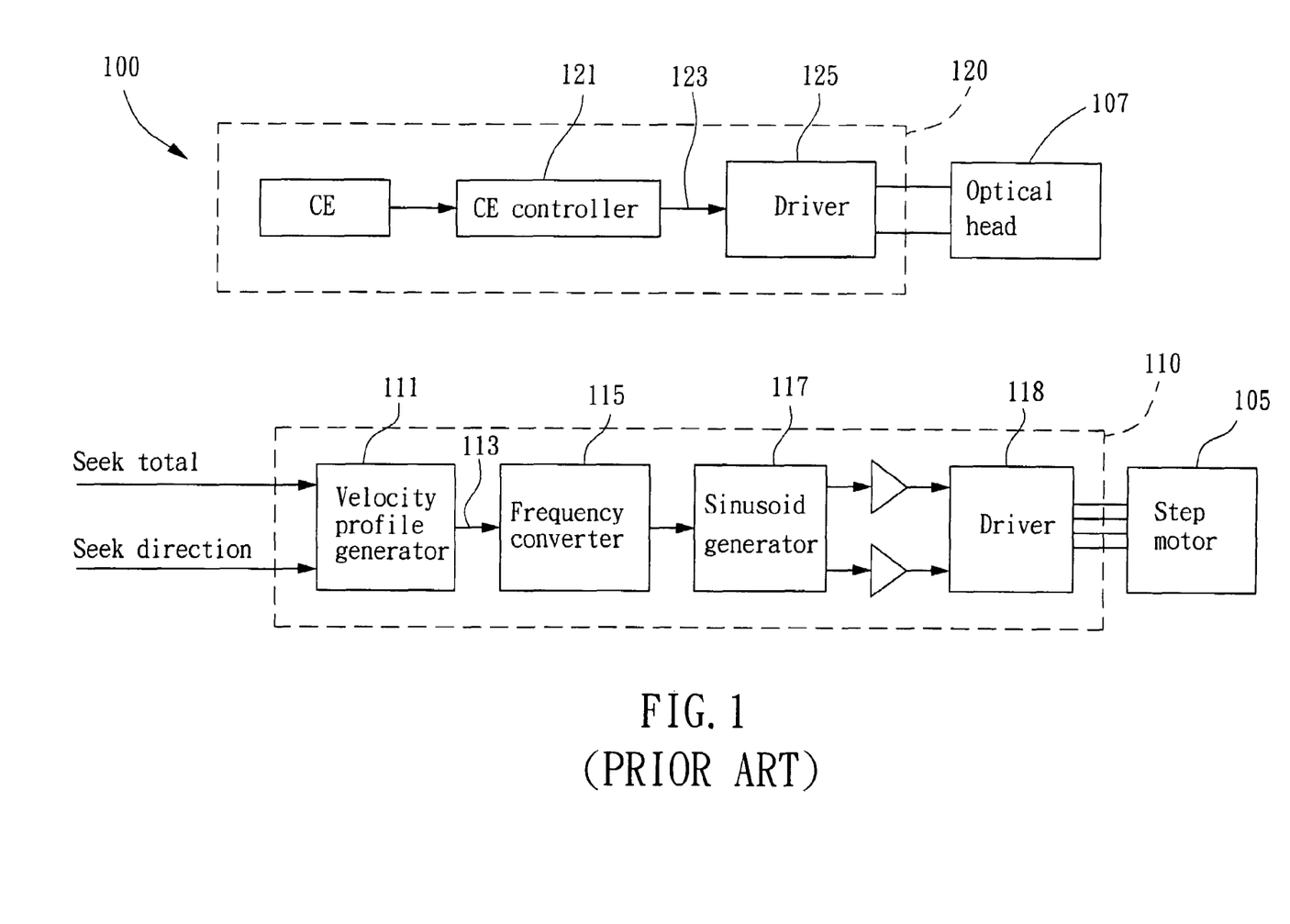
FIG. 1 is a block diagram of a conventional long seek control device for optical disk drive.

Please refer to FIG. 1, which is a schematic drawing of a conventional long seek control device for an optical disk drive. The control device 100 comprises two independent parts. One is a step motor control device 110 capable of controlling a step motor 105 while performing a long seek operation. The other one is an optical head control device 120 capable of controlling an optical head 107 to remain in the center of the mechanism therein while performing the long seek operation.

While performing a long seek operation, the velocity profile generator 111 arranged in the step motor control device 110 will control the motion of the step motor 105 by way of a frequency converter 115, a sinusoid generator 117, and a driver 118 according to the received output information signals 113, such as seek total and seek direction, and so on. Meanwhile, the center error controller 121 in the optical head control device 120 receives a center error signal (CE) to output a seek control signal 123 and controls the optical head 107 to remain in the center of the mechanism therein through the driver 125.

Wherein, the velocity profile generated by the velocity profile generator 110 used for controlling the step motor 105 typically is a ladder shaped profile for conforming to the fast acceleration and deceleration requirements. Please refer to FIG. 2, which is the velocity profile of a conventional velocity profile generator used for controlling the step motor. The step motor 105 starts to accelerate when the long seek begins ($0$~$t_1$), and maintains at a fixed velocity ($t_1$~$t_2$) afterwards, and starts to decelerate before the long distance seek finishes ($t_2$~$t_3$).

Figure 2:
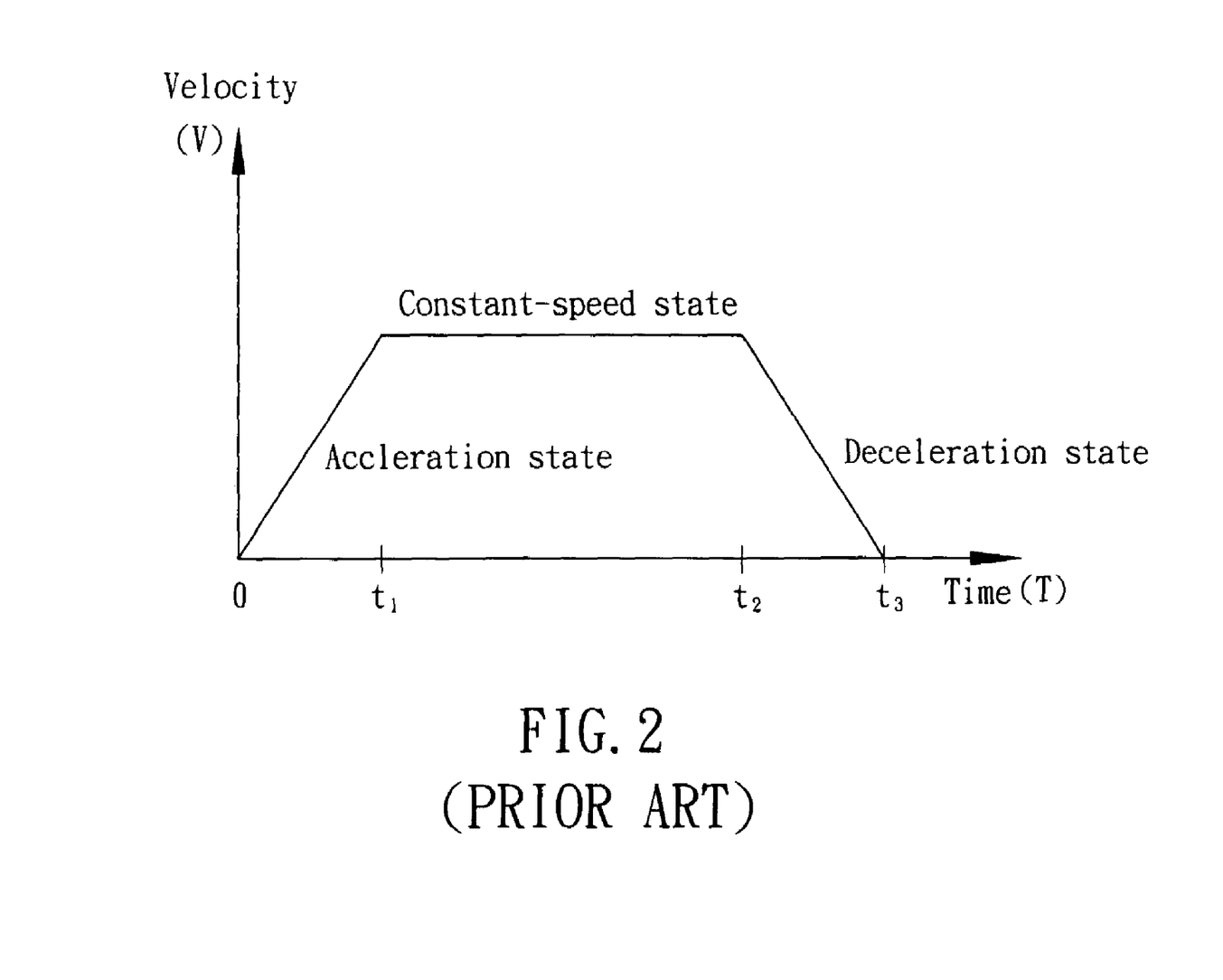
FIG. 2 is a velocity profile of a conventional velocity profile generator used to control the step motor.

Since the optical head control device 120 is using the center error signal during the period of $t_2$~$t_3$, i.e. the long seek is going to finish, the disk that the optical head 107 is seeking is vulnerable to run-out effect such that the optical head 107 is difficult to lock on a track after the seeking.

The conventional method used to reduce the run out effect happening at the end of the seeking, that is, during the period of $t_2$~$t_3$, is to reduce the slope of the velocity profile at the $t_2$~$t_3$ period such the optical head is able to lock on a track easier. However, this method will lengthen the seek time.

In view of the above description, the present invention provides a long seek control device for optical disk drive and method thereof capable of locking on a track properly after seeking and therefore preventing the slipping from happening.

SUMMARY OF THE INVENTION

The primary object of the present invention is to provide a long seek control device for optical disk drive, comprising a step motor control device, a velocity error weighting estimator, an optical head control device, and a mode switching comparator. Wherein, the step motor control device further comprises a velocity profile generator capable of receiving the seek total signal, the seek direction signal, and the remaining track signal for outputting an output signal so as to enable the velocity of the step motor of the optical disk drive to fit in a quadratic function curve according to the output signal. The velocity error weighting estimator generates a velocity error signal according to a first seek velocity signal provided by the velocity profile generator and a second seek velocity signal generated according to an output signal of the optical head. The optical head control device controls the motion of the optical head according to the received signal. As for the mode switching comparator, it switches between and fed one of the following: the center error signal and the velocity error signal, to the optical head control device according to the remaining seek number signal and a threshold.

In a preferred embodiment of the present invention, the step motor control device further comprises a frequency converter, a sinusoid generator, a first attenuator, a second attenuator, and a first driver. And among them, the frequency converter generates a pulse signal by receiving the output signal of the velocity profile generator. The sinusoid generator receives the pulse signal to generate an output signal. The first attenuator outputs a first sled control signal by receiving the output signal of the sinusoid generator. The second attenuator outputs a second sled control signal by receiving the output signal of the sinusoid generator. The first driver receives the first sled control signal and the second sled control signal to control the step motor.

Moreover, a seek counter receives the pulse signal transmitted from the frequency converter and thereafter generates the remaining track number signal for being received by the velocity profile generator of the step motor control device.

The optical head control device further comprises a long seek controller and a second power control device. The long seek control device outputs a seek control signal by receiving the signal transmitted from the mode switching comparator. The second power control device controls the motion of the optical head by receiving the seek control signal. The signals received by the long seek controller include the center error signal and the velocity error signal.

As for the velocity error signal generated by the velocity error weighting estimator, it is generated by using the velocity error weighting estimator to compare the first seek velocity signal provided by the velocity profile generator with the second seek velocity signal provided by a velocity detector, which receives the signal from the optical head.

Another object of the present invention is to provide a long seek control method for optical disk drive, including: generating a quadratic function curve as the reference for the seek velocity of the step motor during seeking; comparing the first seek velocity of the step motor generated according to the quadratic function curve to the second seek velocity obtained from the velocity detector simultaneously to provide the velocity error signal for the feedback control of the optical head during seeking; selecting one of the following: the center error signal and the velocity error signal, to control the motion of the optical head during seeking.

In the preferred embodiment of the present invention, the above-mentioned quadratic function curve has at least one parameter and the curve can be adjusted by adjusting this parameter. This parameter can be varied according to the remaining seek number to adjust the curve. And wherein, the velocity is fixed at a constant before the seeking begins and after the seeking finishes, while the profile is controlled to accelerate and decelerate after the seeking begins and before the seek finishes, respectively. During the seeking, the distribution of the velocity profile is controlled according to the remaining seek number.

The timing of switching between the center error signal and the velocity error signal is depending to the remaining seek number. For instance, during the beginning and the ending stages of the seeking, the motion of the optical head is controlled by the velocity error signal. In the middle stage of the seeking, the motion of the optical head is controlled by the center error signal.

Moreover, an actual velocity error is obtained by comparing the first seek velocity to the second seek velocity, and the seek velocity of previous estimation is weighted according to the actual velocity error so as to adjust the velocity error signal, that is, the larger the actual velocity error is, the smaller the weight is.

To sum up, the present invention provides a long seek control device for optical disk drive and method thereof capable of locking on a track properly after seeking and therefore preventing the slipping from happening.

DESCRIPTION OF THE PREFERRED EMBODIMENT

Figure 3:
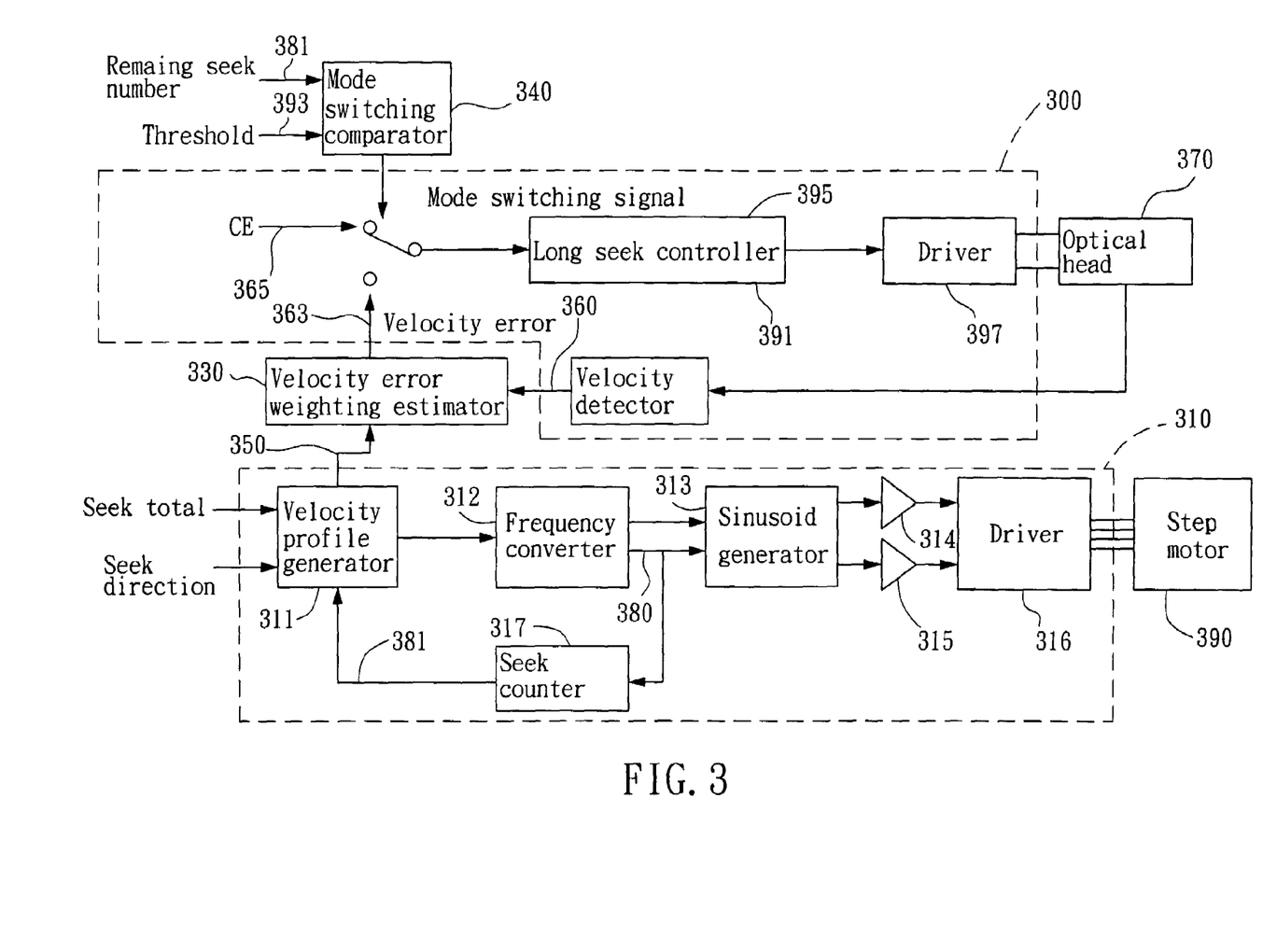
FIG. 3 is a block diagram showing a long seek control device for optical disk drive according a preferred embodiment of the present invention.

Please refer to FIG. 3, which is a block diagram showing a long seek control device for optical disk drive according a preferred embodiment of the present invention. This control device 300 mainly comprises a step motor control device 310, an optical head control device 320, a velocity error weighting estimator 330, and a mode switching comparator 340. Wherein, the velocity error weighting estimator outputs a velocity error signal 363 to be used by the optical head control device 320 for feedback control according to the seek velocity signal 350 provided by the step motor control device 310 and the seek velocity signal 360 provide by the optical head control device 320. Moreover, the mode switching comparator 340 compares the remaining seek number to a threshold value set by the user during the seeking to select and feed one of the following: the velocity error signal 363 and the center error signal 365, to the optical head control device 320 to control the seeking of the optical head 370.

To overcome the disadvantage in the prior art that it reduces the slope of the velocity profile when decelerating the step motor during the seeking that lengthens the overall duration of the seeking, the quadratic velocity profile generated by the velocity profile generator 311 in the step motor control device 310 is segmented according to the remaining seek number. And hence, the step motor control device 310 comprises not only the frequency converter 312, the sinusoid generator 313, the attenuators 314, 315, and the driver 316, but also a seek counter 317. The seek counter 317 receives the pulse signal outputted from the frequency converter 312 to provide a remaining seek number signal 381 for the velocity profile generator 311. Therefore, the distribution of the velocity of the step motor 390 can fit in a quadratic function curve according to the remaining seek number.

Figure 4:
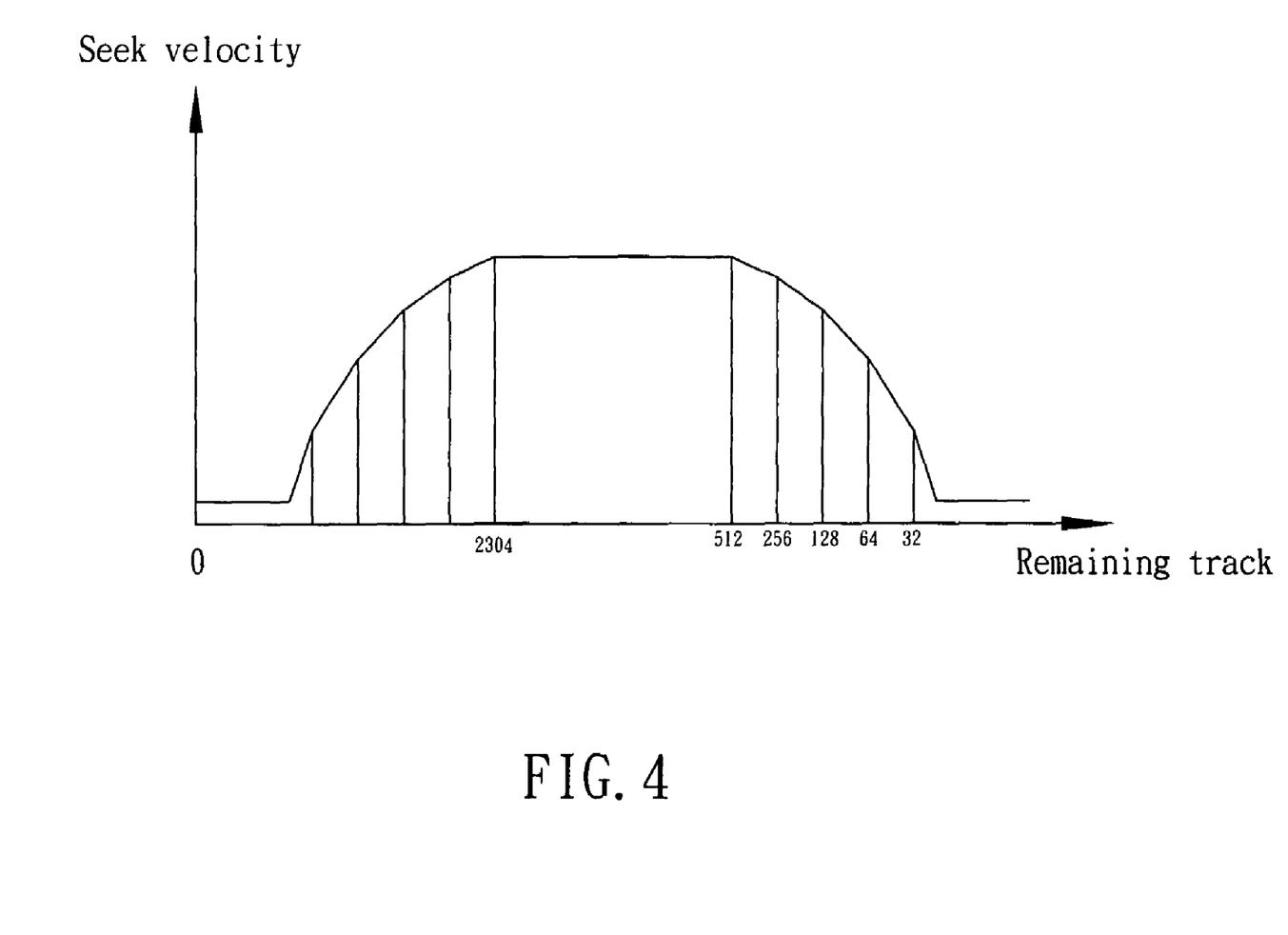
FIG. 4 is a quadratic velocity profile of a preferred embodiment of the present invention.

Please refer to FIG. 4, which is a 4 is a quadratic velocity profile of a preferred embodiment of the present invention. This velocity profile is distributed as a quadratic function that has a parameter $\alpha$. The quadratic profile can increase or decrease progressively according to the value of $\alpha$. Wherein, $\alpha$ decreases along with the decreasing of the remaining seek number. For instances, the seek velocity increases progressively when the step motor 390 just starts seeking (i.e. remaining seek number>2304), the seek velocity of the step motor 390 keeps in a constant speed during the middle stage of the seeking (i.e. remaining seek number lie between 2304~512), and the seek velocity of the step motor decreases progressively when the seeking is about to finish (i.e. remaining seek number is between 512~0). Moreover, the velocity of the step motor 390 remains at a constant before the beginning and after the ending of the seeking in order to help the optical head 370 to lock on a track.

Hence, instead of the slow linear velocity deceleration seen in the prior art, the seek velocity of the step motor 390 can be controlled according to the remaining seek number and decrease progressively during the ending of the seeking.

Different from the prior art, the optical head control device 320 not only solves the problem of the small slop of the velocity profile during the deceleration stage of the step motor, but it also capable of receiving the feedback control from the step motor control device 310 through the velocity error weighting estimator 350. Therefore, the optical head control device 320 can receive either the velocity error signal (VE) 363 or the center error signal (CE) 365 outputted from the velocity error weighting estimator 330 through the mode switching comparator 340. Accordingly, when the optical head 370 performs a long seek operation, the mode switching comparator 340 can compare the remaining seek number signal 381 with a threshold value signal 393 set by the user to select one of the following: the velocity error signal 363 and the center error signal 365, to feed into the optical head control device 320, such that the optical head control device 320 can use either the VE mode or the CE mode to control the motion of the optical head through the long seek controller 395 and the driver 397.

Figure 5:
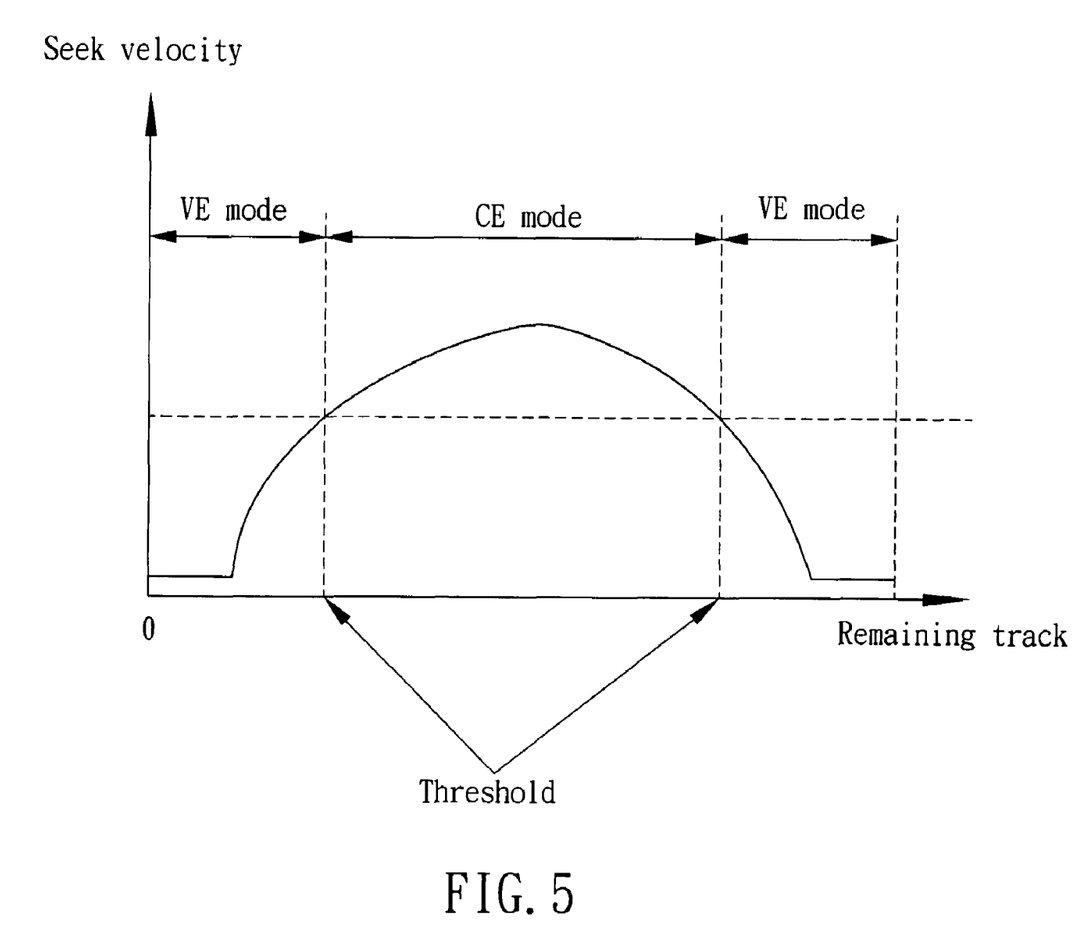
FIG. 5 is a diagram showing a long seek mode switching mechanism according to a preferred embodiment of the present invention.

Please refer to FIG. 5, which is a diagram showing a long seek mode switching mechanism according to a preferred embodiment of the present invention. By utilizing the threshold value provided by the threshold value signal 393, the mode switching comparator 340 will switch between the velocity error signal 363 and the center error signal 365 and send the selected signal to the long seek controller 395 of the optical head control device 320. Hence, the optical head 370 will perform the seek operation utilizing either the velocity error signal 363 or center error signal 365 depending on the remaining tracks.

Those skilled in the art will know that the optical head 370 can be accelerated/decelerated to synchronize with the step motor 390 while the velocity error signal is used for the seeking. It has the advantage of enhancing the lock-on stability of the optical head after the seeking. As for the optical head 370 that uses the center error signal 365 for performing the seek operation, the bandwidth of the center error signal 365 is not limited comparing to the velocity error signal 363 that is. The optical head 370 will remain in the center of the sled mechanism to reduce the overall seek time. Therefore, using the velocity error signal 363 as the control mode in the beginning and the ending of the seeking will stabilize the optical head 370 and enable the lock-on successfully. Using the center error signal 365 as the control mode of the optical head during the middle stage of the seeking will reduce the seek time thereof and therefore has a better performance.

The present invention further provides a weight mode for the velocity error signal 363 to adjust the incorrect seek velocity signal 360 and the corresponding incorrect velocity error signal 363 caused by the stains or scratches on the disk. Please refer to FIG. 6, which is a schematic diagram of velocity error weighting estimator 330 according to a preferred embodiment of the present invention. After the velocity error weighting estimator 330 receives the seek velocity signal 350 and another seek velocity signal 360, the seek velocity signal 360 has to be adjusted by a velocity gain before comparing with the seek velocity signal 350 in order to obtain an actual velocity error signal 510 since the seek velocity signal 350 and the seek velocity signal 360 have different units.

Figure 6:
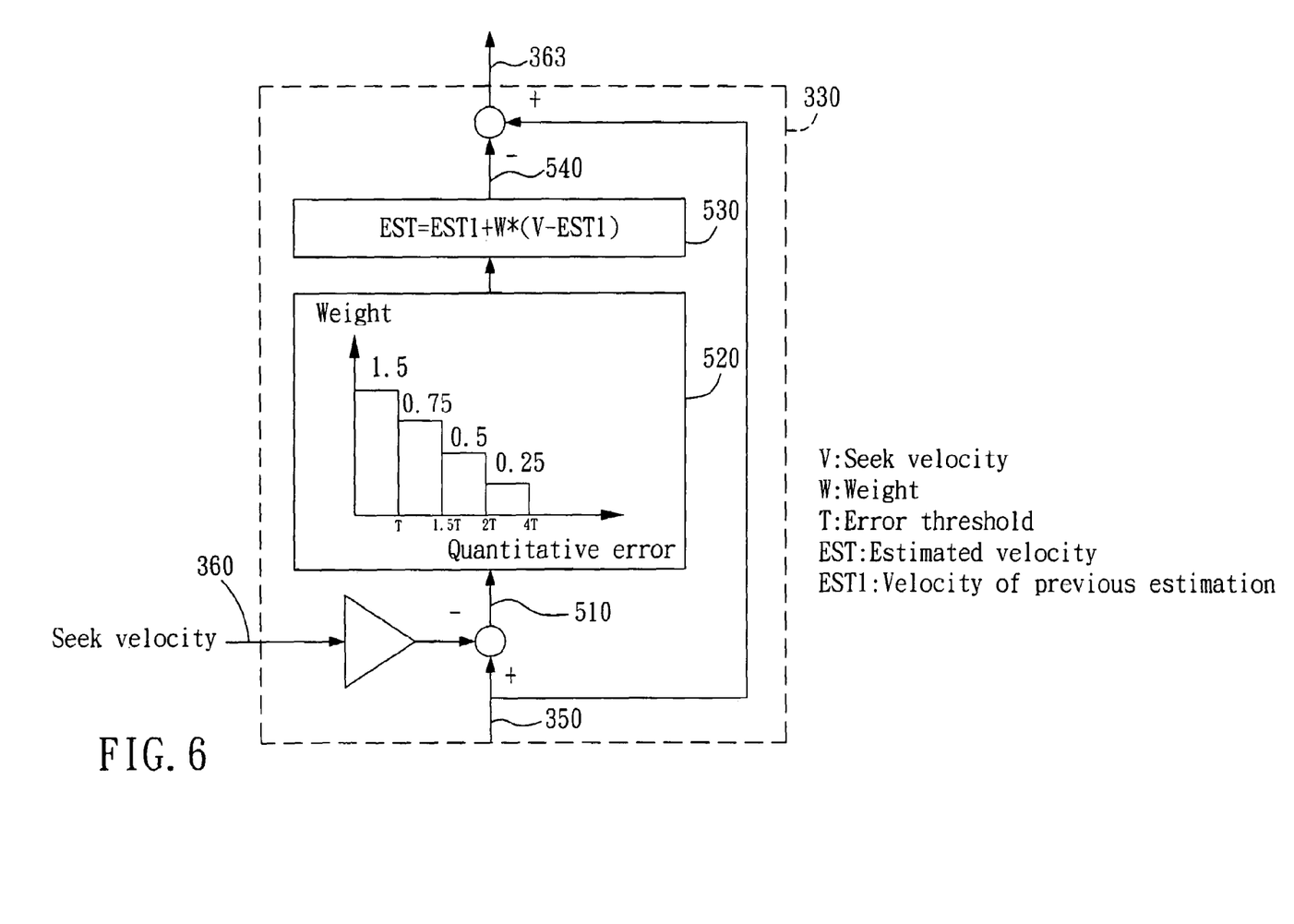
FIG. 6 is a schematic diagram of velocity error weighting estimator 330 according to a preferred embodiment of the present invention.

An estimated velocity signal 540 can be obtained by the actual velocity error signal 510 through the weighting table 520 and the weighting formula 530. Wherein, the weighting table 520 quantitates the corresponding actual velocity error of the actual velocity error signal 510 into T, 1.5 T, 2T, and etc., in addition, the larger the quantitative error is, the smaller the corresponding weighting factor (w) is. In another words, the larger the quantitative error of the actual velocity error signal 510 is, i.e. the actual velocity error signal 510 is more inaccurate, therefore, the smaller the corresponding weighting factor is.

Hence, by obtaining a weighting factor w through the actual velocity error signal 510 with reference to the weighting table 520 and by utilizing the weighting formula 530, an estimated velocity signal 540 can be obtained, i.e. by multiplying the weighting factor w with the difference obtained by subtracting the previous estimated velocity EST1 from the current velocity v and adding the product thereof with EST1. Meanwhile, the velocity error signal 363 that is actually needed can be obtained by comparing the estimated velocity signal 540 to the seek velocity signal 350.

By the weighting method, the velocity error signal 363 will not produce the incorrect seek velocity signal caused by the stains or scratches on the disk so that the optical head 370 is more stable during a high speed long seek operation.

In summery, the present invention provides a long seek control device for optical disk drive and method thereof that by providing a quadratic velocity profile to control the step motor during the seek operation, the velocity of the step motor can be decelerated progressively when finishing the seek to lock on a track successfully. Moreover, by alternating the modes between the center error and velocity error signals, the optical head can have the optimum stabilization and the optimum seek time. Finally, with the weighting control of the seek velocity signal, the optical head can be more stable when performing the high speed seek operation While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A long seek control device for optical disk drive, comprising:
   a step motor control device, further comprising:
      a velocity profile generator, capable of receiving a seek total signal, a seek direction signal, and a remaining seek number signal to output an output signal so as to enable the velocity profile of a step motor of the optical disk drive to fit in a quadratic function curve according to the output signal;
   a velocity error weighting estimator, capable of generating a velocity error signal according to a first seek velocity signal provided by the velocity profile generator and a second seek velocity signal generated by an signal outputted from the optical head;
   an optical head control device, capable of controlling the motion of the optical head according to a signal received by the same; and
   a mode switching comparator, capable of selecting one of the following: a center error signal and the velocity error signal, according to the remaining seek number signal and a threshold, and sending the selected signal to the optical head control device.

2. The long seek control device for optical disk drive according to claim 1, wherein the step motor control device further comprises:
   a frequency converter, capable of producing a pulse signal by receiving the output signal of the velocity profile generator;
   a sinusoid generator, capable of producing an output signal by receiving the pulse signal;
   a first attenuator, capable of producing a first sled control signal by receiving the output signal of the sinusoid generator;
   a second attenuator, capable of producing a second sled control signal by receiving the output signal of the sinusoid generator; and
   a first driver, receiving the first sled control signal and the second sled control signal for controlling the motion of the step motor.

3. The long seek control device for optical disk drive according to claim 2, the device further comprising:
   a seek counter, receiving the pulse signal so as to output the remaining seek number signal to the velocity profile generator.

4. The long seek control device for optical disk drive according to claim 1, wherein the optical head control device further comprises:
   a long seek controller, receiving the signal transmitted from the mode switching comparator to output a seek control signal; and
   a second power control device, receiving the seek control signal to control the motion of the optical head.

5. The long seek control device for optical disk drive according to claim 4, the device further comprising:
   a velocity detector, receiving the signal outputted from the optical head to produce the second seek velocity signal.

6. The long seek control device for optical disk drive according to claim 1, wherein the step motor is a step motor.

7. A long seek control method for optical disk drive, including:
   generating a quadratic function curve as the velocity profile of a step motor;
   comparing a first seek velocity of the step motor generated according to the quadratic function curve to a second seek velocity obtained from the velocity detector simultaneously to provide a velocity error signal for the feedback control of an optical head during a seeking;
   selecting one of the following: a center error signal and the velocity error signal, to control the motion of the optical head during the seeking.

8. The long seek control method for optical disk drive according to claim 7, wherein the quadratic function curve has at least one parameter used for adjusting the quadratic function curve by adjusting the parameter.

9. The long seek control method for optical disk drive according to claim 8, the method further including:
   adjusting the quadratic function curve according to the remaining track number of the seeking.

10. The long seek control method for optical disk drive according to claim 9, the method further including:
    fixing the velocity of the quadratic function curve at a constant before the seeking begins and after the seeking ends.

11. The long seek control method for optical disk drive according to claim 10, the method further including:
    controlling the acceleration and deceleration of velocity of the quadratic function curve respectively during the beginning and the ending of the seeking.

12. The long seek control method for optical disk drive according to claim 11, the method further including:
    using the remaining track number of the seeking to control the distribution of the quadratic function curve during the middle of the seeking.

13. The long seek control method for optical disk drive according to claim 7, the method further including:
    according to a remaining track number of the seeking to switch between the center error signal and the velocity error signal.

14. The long seek control method for optical disk drive according to claim 13, the method further including:
    controlling the motion of the optical head using the velocity error signal during the beginning and the ending of the seeking.

15. The long seek control method for optical disk drive according to claim 14, the method further including:
    controlling the motion of the optical head using the center error signal during the middle of the seek.

16. The long seek control method for optical disk drive according to claim 7, the method further including:
    comparing the first seek velocity to the second seek velocity for obtaining an actual velocity error; and
    adding a weighting value to a seek velocity detected previously according to the actual velocity error so as to adjust the velocity error signal.

17. The long seek control method for optical disk drive according to claim 16, wherein the larger the actual velocity error is, the smaller the weighting value is.

\* \* \* \* \*